S. I. MESERAULL.
VEGETABLE CUTTER AND GRATER.
APPLICATION FILED MAR. 29, 1909.
953,790.
Patented Apr. 5, 1910.
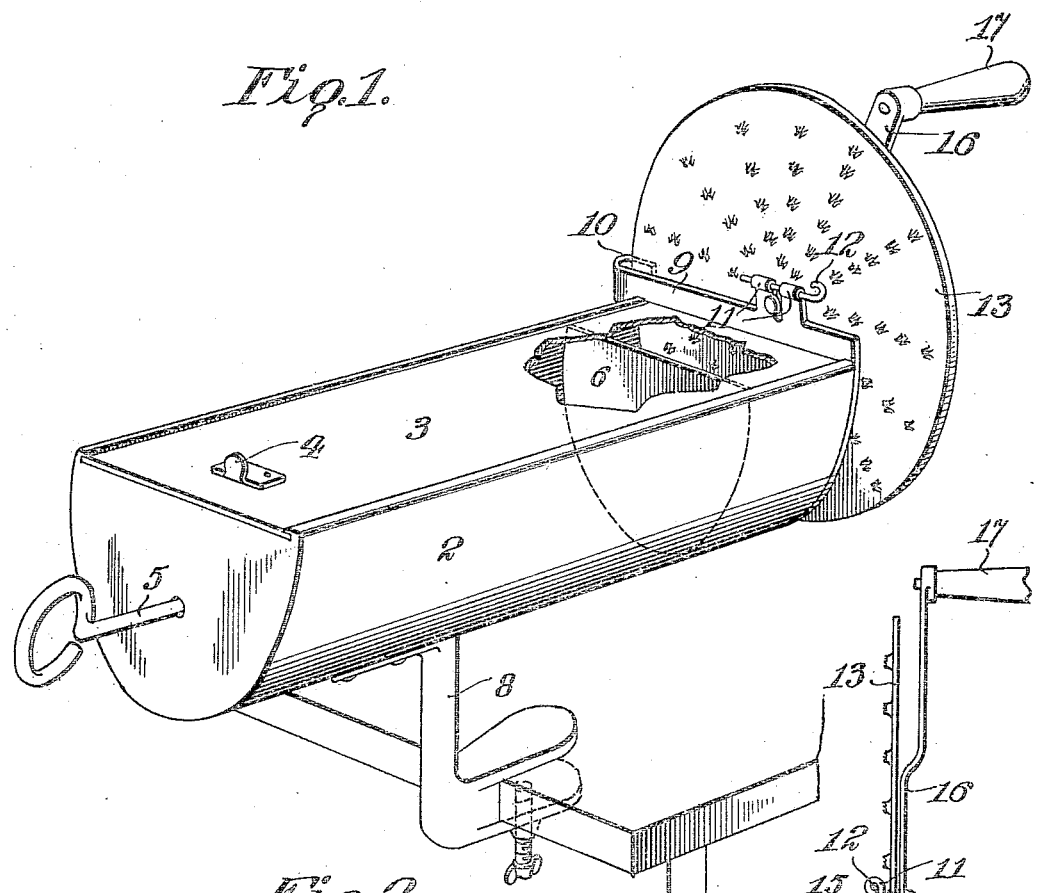
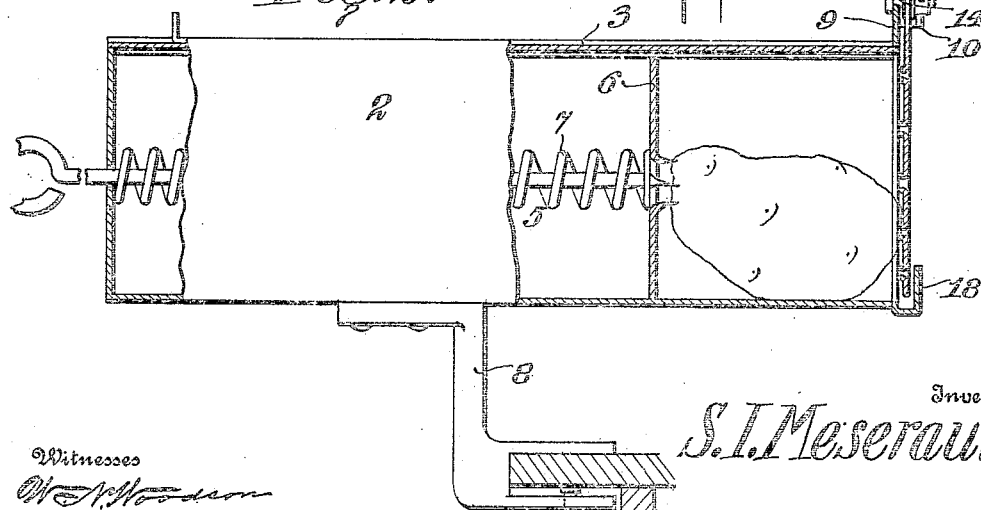
Witnesses
Inventor
S. I. Meseraull.
Attorneys

UNITED STATES PATENT OFFICE.

SAMUEL I. MESERAULL, OF KANSAS CITY, KANSAS.

VEGETABLE CUTTER AND GRATER.

953,790.  Specification of Letters Patent.  Patented Apr. 5, 1910.

Application filed March 29, 1909. Serial No. 486,388.

*To all whom it may concern:*

Be it known that I, SAMUEL I. MESERAULL, citizen of the United States, residing at Kansas City, in the county of Wyandotte and State of Kansas, have invented certain new and useful Improvements in Vegetable Cutters and Graters, of which the following is a specification.

My invention relates to kitchen utensils, and particularly to a utensil adapted for the grating of nutmegs or vegetables, or for the slicing of the same. In general, my device comprises a casing wherein the material to be grated is placed, and wherein it is forced forward, and a removable grating wheel fitted at the end of the casing and adapted to be rotated.

For a full understanding of the invention and the merits thereof, and to acquire a knowledge of the details of construction, reference is to be had to the following description and accompanying drawing, in which:

Figure 1 is a perspective view of my improved grating apparatus; and, Fig. 2 is a side elevation of the same partly in section.

Corresponding and like parts are referred to in the following description and indicated in all the views of the drawing by the same reference characters.

The device consists of a receptacle 2, preferably elongated and open at the upper side, this side being, however, closed by a sliding cover 3, the upper edges of the receptacle being turned inward to form flanges to receive the sliding cover. This cover 3 is formed with a projecting lug 4, whereby the cover may be manipulated. The rear end of the casing 3 is solid except for a perforation through which passes a plunger 5. The rear end of the plunger is formed into an eye, whereby it may be easily manipulated, and the forward end is provided with the disk 6. A coil spring 7 surrounds the rod 5 and acts to force the disk 6 forward in the casing 2. The bottom of the casing is provided with a clamp 8, whereby the device may be supported on a table or other suitable article. The forward end of the casing 2 has an upwardly bent flange 9 which extends across the front of the casing on the top thereof and at its extremity is outwardly and then inwardly bent, as at 10, to form a guard lip. The flange 9 at a point near to its other end, is provided with the upwardly extending opposed lugs 11 which are mutually cut away to form a bearing for a grating disk 13. Passing through the upper ends of the lugs 11, is the transverse pin 12 which acts to close the slot between the lugs 11 and to hold the grating disk in position in its bearing. The grating disk 13 is of metal, and has its inner face formed with grating burs of any suitable character, or with slicing knives. The center of the wheel, on its inside face, has a projecting hub 14 whose end is overturned to form a flange 15. This hub 14 is adapted to be inserted in the slot between the upstanding ears 11 and to be held in place by the pin 12. The hub 14 preferably projects through the disk 13 and is overturned upon a crank arm 16 having a handle 17. The outer portion of the crank arm is offset so as to escape the lip 10, as shown in Fig. 2. The under-side of the receptacle 2 is also provided with a lip 18, and the two lips 10 and 18 keep the disk 13 in such position that it will bear against the material carried in the receptacle 2 and before the plunger disk 6.

It will be seen that my device is so constructed that by removing the pin 12, the grating wheel or disk may be lifted entirely out of engagement with the receptacle 2, and that the cover 3 may be also entirely removed. Thus providing for a very thorough cleaning of the apparatus, it being recognized that devices of this character should be so constructed as to be readily and perfectly cleaned before and after use. It will also be seen that the device as devised by me, is extremely simple in its construction, has no complicated parts, and is practically in three pieces, namely: the disk 13, the receptacle 2, and the cover 3.

While I have shown the clamp as attached to the receptacle, I do not wish to be limited to this, as it is obvious that the receptacle might be movably mounted upon a suitable base, or that any other form of clamp might be used besides that shown.

In order to hold the object to be grated or sliced, I provide the outer face of the disk 6 with prongs 18, as shown clearly in Fig. 2.

Of course the device may be made in various sizes to suit the different materials to be grated. Thus the larger size could be used for shredding or grating vegetables of various kinds, while the much smaller size could be used as a grater for nutmegs and like materials, it not being necessary, in this latter case, to provide the receptacle with a sliding cover, but merely to provide the cover with an opening through which the nutmeg could be placed. Neither would it be necessary, in this latter case, to removably mount the grating disk, as it could be fixed in position.

I do not wish to limit myself to having the lugs 11 formed upon the upper edge of the flange 9, as these lugs might project from other portions of the flange and equally well receive the pivot of the grating disk.

Having thus described the invention, what is claimed as new is:—

A device of the character described, including a receptacle open at one end and closed at the other and having a removable cover, a plunger rod extending into the receptacle through the closed end thereof and having a plunger disk at one end, a spring surrounding the rod and engaging with the closed end of the receptacle and the inner face of the plunger disk, an upwardly turned flange on the forward end of the receptacle having its lateral extremity outwardly and then inwardly turned to form a disk-engaging lip, opposed ears upwardly extending from the flange and forming together a split bearing, the ends of said ears being bent around to form opposed beads, a pin passing through the beads and closing the opening between the ears and cutting disk, a hub on the cutting disk having an outwardly projecting annular flange, said hub being adapted to be received between said ears, a handle on the rear of said disk, a lip formed on the lower edge of said receptacle, bent outwardly and then upwardly to engage around the disk, and a clamp whereby the device may be supported.

In testimony whereof I affix my signature in presence of two witnesses.

SAMUEL I. MESERAULL. [L. S.]

Witnesses:
J. T. WALLACE,
C. SIMONS.